Dec. 13, 1949 J. C. HOLLAND 2,491,044
TRUCK FRAME EXTENSION
Filed Aug. 31, 1946
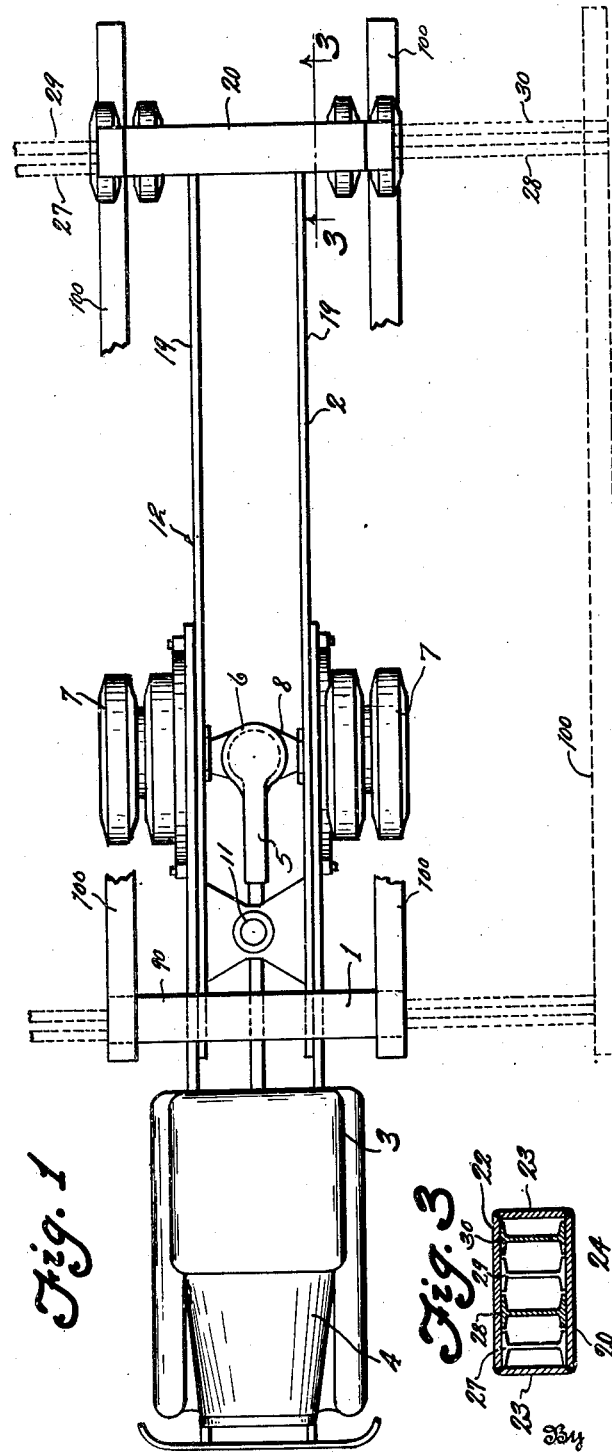
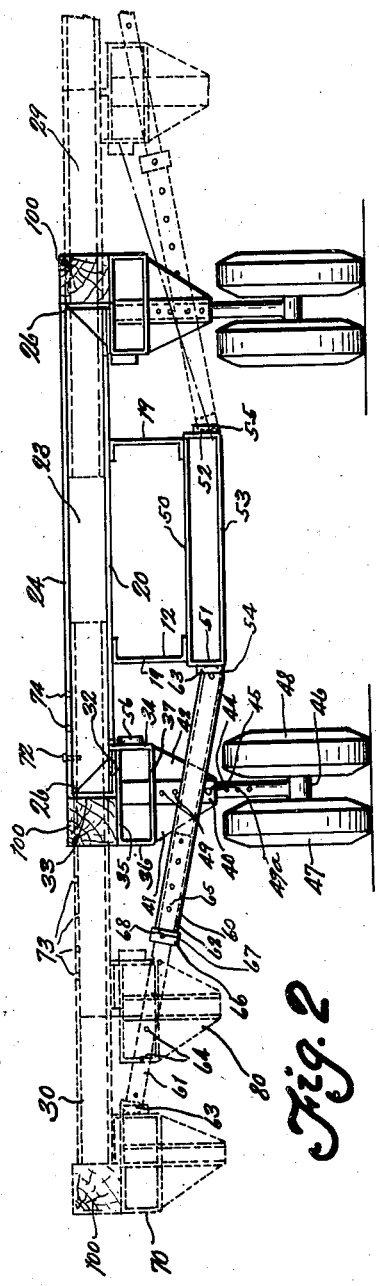
Inventor
James C. Holland
By
Lyon & Lyon
Attorneys

UNITED STATES PATENT OFFICE 2,491,044

TRUCK FRAME EXTENSION

James C. Holland, Los Angeles, Calif.

Application August 31, 1946, Serial No. 694,179

10 Claims. (Cl. 280—34)

This invention relates to vehicles, and, more particularly, to a vehicle in the form of a truck or trailer adapted to be laterally extended to accommodate loads of varying widths.

In modern industry road transportation is frequently called upon to handle loads such as prefabricated sections of structures or houses to be moved whose overall width exceeds the conventional truck or trailer widths. Furthermore, in case a truck or trailer is built having a width exceeding certain specified limits it is generally not permitted to use the public highways except under special conditions and under special permit.

It is, accordingly, one object of this invention to provide a truck or trailer which is normally of the permissible conventional width but which is laterally extensible to accommodate loads of various sizes and widths.

It is a further object of this invention to provide a vehicle of the class described which can pass to and from locations without special permit.

It is a further object of this invention to provide a vehicle of the class described in which the load supporting wheels are located substantially directly beneath the most extended portions of the vehicle frame.

It is a feature of this invention that the frame is provided with extensible cross pieces which are adjustable in a plurality of extended positions and may be locked in such positions and re-enforced by similarly extensible and adjustable trusses.

It is a further feature of this invention that the wheel supporting mounts employed are provided with adjustments whereby the height of the vehicle bed may be regulated.

Further objects and advantages will be apparent from the annexed specification in which Figure 1 is a plan view with parts broken away for clarity of description of a vehicle embodying the present invention;

Fig. 2 is an end view partly in phantom showing the vehicle in both constricted and extended conditions;

Fig. 3 is a section through one of the cross pieces taken along the line 3—3 of Fig. 1.

Referring more particularly to the drawings, there is illustrated a vehicle in the form of a truck, indicated generally at 1 and including a frame 2, a cab 3, a motor 4, a drive shaft 5, a differential 6 and drive wheels 7 mounted on an axle 8 all in the conventional manner.

Mounted on the frame 2 of the truck by means of a conventional pivot bearing 11 is a semitrailer 12. The trailer 12 is relatively long and comprises a pair of opposed channel members 19 extending substantially the full length of the trailer. At the rear end of a frame a rectangular cross plate 20 is welded to the frame and forms the bottom member of an elongated open-ended box or channel 24. The box 24 also includes a pair of rectangular side pieces 23 and a rectangular top plate 22. The lower corner of the outer ends of each of the side pieces 23 is cut away as indicated at 26. The box or channel 24 is adapted to contain four I beams in side by side relation and numbered 27, 28, 29 and 30 respectively, as shown in Fig. 3. These I beams are slidably mounted in the box 24 and are each of a length substantially equal to the overall length of the box 24.

Adjacent the outboard ends of the I beams 28 and 30 a plate 32 is welded or otherwise secured to the undersides of these beams and a vertically extending plate 33 is similarly welded across their ends. Another plate, 34, is welded across the undersides of the beams 28 and 30 and to the inner edge of the plate 32 and extends downwardly as indicated in Fig. 2. A horizontally extending plate 35 is welded to the plate 34 and to the bottom edge of the plate 33 which bottom edge extends slightly below the plate 32 as indicated. The plate 35 forms the top piece of a wheel mount as hereinafter described. A plate 36 is welded to the outer edge of the plate 35 and a horizontally extending plate 37 is welded to the plates 34 and 36 and forms the bottom piece of a box-like structure.

A vertically disposed hollow column 40 shown here in the form of a tubular member but which may take other forms, as, for instance, a column of rectangular cross section, has its upper end welded to the bottom of the plate 35 and extends through an aperture in the plate 37 as indicated. The column 40 is welded to the plate 37 as it passes through the aperture therein and a pair of triangular plates 41 and 42 are welded to the plate 35 and the column 40 in supporting relation thereto.

A vertically extending post 44, shown here as cylindrical in form, but which will take a form such as to fit within the column 40 in telescoping relation, is disposed within the column 40 with its lower end extending downwardly therefrom and carries on its lower end a stub axle 46 on which are rotatably mounted the wheels 47 and 48. The column 40 as well as the post 44 are provided with a plurality of mating holes 49 and 49a for the reception of a retaining bolt 45, and the post 44 may thus be adjusted in its telescoping relation to the column 40 so as to vary the height of the vehicle bed.

An extension comprising a horizontal plate 50, side plates 51 and 52 and a bottom plate 53 is secured to the bottom of the frame 12 and a socket 54 having a concave seat is secured to the side plate 51. A similar socket 55 is secured to the side plate 52 and a similar socket 56 is carried by the plate 34 of the wheel mount.

A truss 60, including a pair of telescoping members 61 and 62 having spherical headed members 63 welded into the ends thereof, is provided adapted to extend from the socket 54 to the socket 56 with the spherical headed members 63 seated in the sockets. Mating holes 64 and 65 are provided in the members 61 and 62 and the member 62 is provided with a re-enforcing collar 66, also provided with a mating hole 67, which collar 66 is slidable on the member 62 and adapted to receive a retaining bolt 68 for locking the truss in any of a plurality of extended positions.

The truss 60 is retained in position simply by the seating of the spherical headed members 63 within the sockets 54 and 56 and is thus removable when the vehicle is in constricted condition.

As indicated by the portions shown in phantom the structure including the wheel mount and the wheels is extensible simply by sliding the pair of I beams 28 and 30 outwardly in the channel or box 24. The device can be positioned at a number of positions intermediate the extreme expanded position indicated at 70 and the minimum expanded position indicated at 80. Furthermore, the device may be closed to its full constricted position as shown in the full lines in Fig. 2. In any of these positions the I beams may be secured by means of fixing the bolt 72 in a selected one of the mating holes 73 in the upper piece of the I beams and in a selected one of the mating holes 74 in the plate 24.

While the wheel mount and the associated structure related to the I beams 28 and 30 has been described in detail it will be understood that the I beams 27 and 29 are provided with a similar structure and the vehicle is thus extensible on both sides. Furthermore, as shown the front of the truck bed is likewise provided with a channel member 90 entirely similar to the channel member 24 and similarly houses a nest of I beams similarly supporting extensible wheel mounts and wheels.

A pair of large wooden beams 100, preferably 8" x 8" in cross section, are disposed one on each side of the vehicle and mounted on the shoulders formed by the wheel mounts such as the shoulder formed by the plates 33 and 35 and together with the extended I beams and the channel members 24 and 90 form the vehicle trailer bed.

The above description has been applied to a semitrailer, but it will be readily apparent that the invention is equally applicable to other types of vehicles such as, for example, to a full trailer or extensible truck.

From the foregoing description it will be apparent that there has been provided a vehicle which in its constricted position may be of conventional width but which may be extended in a plurality of extended positions to accommodate varying sized loads and that in all such positions the load supporting wheels are similarly extended to remain substantially directly beneath the load carrying beams.

While there has been described what at present is considered a preferred embodiment of the invention, it will be understood that various changes and modifications can be made therein without departing from the essence of the invention and it is intended to cover all such changes and modifications as come within the true spirit and scope of the appended claims.

What is claimed is:

1. In a vehicle the combination of a longitudinally extending frame, an extensible cross piece carried by said frame, a wheel mount carried by the outboard end of said cross piece, a wheel mounted in said wheel mount, and an adjustable truss extending from a portion of said frame directly beneath said cross piece to a position adjacent said outboard end for releasably locking said cross piece in position whereby said vehicle is adjustable in width to accommodate varying sized loads, said truss when in extended position supporting said outboard end under compression.

2. In a vehicle the combination of a longitudinally extending frame, a cross piece carried by said frame, said cross piece being laterally extensible to either side of said frame, a pair of wheel mounts, one of said wheel mounts carried by each outboard end of said cross piece, a pair of adjustable trusses, each extending from a portion of said frame directly beneath said cross piece to a position adjacent a separate one of said outboard ends for releasably locking and supporting said cross piece in position said trusses when in extended position each supporting its associated outboard end under compression, a wheel mounted in each of said wheel mounts whereby said vehicle is adjustable in width to accommodate varying sized loads.

3. In a vehicle the combination of a longitudinally extending frame, a front cross piece and a rear cross piece carried by said frame, each of said cross pieces being laterally extensible to either side of said frame, four wheel mounts, each of said wheel mounts respectively being carried by an outboard end of one of said cross pieces and a wheel mounted in each of said wheel mounts, a pair of longitudinally extending beams disposed one on each side of said frame and each having its ends supported adjacent a separate one of said wheel mounts and four adjustable trusses, each associated with one of said wheel mounts and each extending from a portion of said frame to a position adjacent its associated wheel mount for releasably locking each of said cross pieces in position whereby said vehicle is adjustable in width to accommodate varying sized loads.

4. In a vehicle the combination of a longitudinally extending frame, an extensible cross piece carried by said frame, a wheel mount carried by the outboard end of said cross piece, said wheel mount including a sleeve member and an inner member telescoping therein, a stub axle carried by said inner member and a pair of load supporting wheels mounted on said stub axle whereby said vehicle is adjustable in width to accommodate varying sized loads.

5. In a vehicle the combination of a longitudinally extending frame, a front cross piece and a rear cross piece carried by said frame, each of said cross pieces being laterally extensible to either side of said frame, four wheel mounts, each of said wheel mounts respectively being carried by an outboard end of one of said cross pieces and said wheel mounts each including a sleeve member and an inner member telescoping therein, a stub axle carried by each of said inner members and a pair of wheels mounted on each of said stub axles whereby said vehicle is adjustable in width to accommodate varying sized loads.

6. In a vehicle the combination of a longitudinally extending frame, a front cross piece and a rear cross piece carried by said frame, each of said cross pieces being laterally extensible to either side of said frame, four wheel mounts, each of said wheel mounts respectively being carried by an outboard end of one of said cross pieces and said wheel mounts each including a sleeve member and an inner member telescoping therein, a stub axle carried by each of said inner members, a pair of wheels mounted on each of said stub axles whereby said vehicle is adjustable in width to accommodate varying sized loads, and means for adjusting said inner member within said sleeve to vary the vertical position of said wheels.

7. In a vehicle the combination of a longitudinally extending frame, an extensible cross piece carried by said frame, a wheel mount carried by the outboard end of said cross piece, a wheel mounted in said wheel mount, a first socket formed on said frame, a second socket formed adjacent said outboard end, an extensible truss having a mating member formed on each end of said truss and mating with said sockets for releasably locking said cross piece in position whereby said vehicle is adjustable in width to accommodate varying sized loads.

8. In a vehicle the combination of a longitudinally extending frame, an extensible cross piece carried by said frame, a wheel mount carried by the outboard end of said cross piece, a wheel mounted in said wheel mount, a first socket formed on said frame, a second socket formed adjacent said outboard end, an extensible truss having a mating member formed on each end of said truss and mating with said sockets for releasably locking said cross piece in position, and said sockets and mating member permitting removal of said truss when said cross piece is unextended whereby said vehicle is adjustable in width to accommodate varying sized loads.

9. In a vehicle the combination of a longitudinally extending frame, an extensible cross piece carried by said frame, said cross piece including a channel member and a plurality of metallic beams being slidable in both directions in said channel member to form extensions on each end of said cross piece, a wheel mount carried by each outboard end of said metallic beams and said wheel mounts each including a sleeve member and an inner member telescoping thereon, a stub axle carried by each of said inner members, and a pair of wheels mounted on each of said stub axles whereby said vehicle is adjustable in width to accommodate varying sized loads.

10. In a vehicle the combination of a longitudinally extending frame, a front cross piece and a rear cross piece carried by said frame, each of said cross pieces including a channel member and a plurality of metallic beams disposed therein, said metallic beams being slidable in both directions in said channel members to form extensions on each side of said channel members, four wheel mounts, each of said wheel mounts respectively being carried by an outboard end of each one of said metallic beams, said wheel mounts each including a sleeve member and an inner member telescoping therein, a stub axle carried by each of said inner members and a pair of wheels mounted on each of said stub axles, a pair of longitudinally extending beams disposed one on each side of said frame and each having its ends supported adjacent a separate one of said wheel mounts and a plurality of adjustable trusses, each associated with one of said wheel mounts and each extending from a portion of said frame to a position adjacent its associated wheel mount for releasably locking each of said metallic beams in position whereby said vehicle is adjustable in width to accommodate varying sized loads.

JAMES C. HOLLAND.

REFERENCES CITED

The following references are of record in the file of this patent:

UNITED STATES PATENTS

| Number | Name | Date |
| --- | --- | --- |
| 107,710 | Osgood | Sept. 27, 1870 |
| 1,122,805 | Schertz | Dec. 29, 1914 |
| 1,210,056 | Fairman | Dec. 26, 1916 |
| 1,710,122 | Sorenson | Apr. 23, 1929 |
| 1,720,796 | Marcum | July 16, 1929 |
| 1,832,932 | Hurst | Nov. 24, 1931 |
| 2,248,080 | Hathaway | July 8, 1941 |
| 2,337,615 | McLaren | Dec. 28, 1943 |
| 2,377,959 | Peters | June 12, 1945 |